(12) United States Patent
Rohs et al.

(10) Patent No.: US 6,273,823 B1
(45) Date of Patent: *Aug. 14, 2001

(54) SEAL FOR A TORSIONAL VIBRATION DAMPER

(75) Inventors: Ulrich Rohs; Hans Rohs, both of Düren; Dietmar Heidingsfeld, Aachen, all of (DE)

(73) Assignee: Rohs-Voigt Patentverwertungsgesellschaft mbH, Düren (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/181,126

(22) Filed: Oct. 28, 1998

(30) Foreign Application Priority Data

Oct. 29, 1997 (DE) .............................................. 197 47 785
Nov. 5, 1997 (DE) .............................................. 197 48 730
Apr. 22, 1998 (DE) ............................................ 198 17 905

(51) Int. Cl.$^7$ .................................................... F16D 3/12
(52) U.S. Cl. .................................. 464/68; 464/7; 464/24
(58) Field of Search ................................ 464/7, 24, 67, 464/68

(56) References Cited

U.S. PATENT DOCUMENTS

| | | |
|---|---|---|
| 2,846,245 | 8/1958 | Weaver . |
| 2,891,808 | 6/1959 | Richardson . |
| 4,848,937 | 7/1989 | Hartman et al. . |
| 5,355,747 | * 10/1994 | Kajitani et al. ...................... 74/573 F |
| 5,667,053 | * 9/1997 | Rohrle et al. ....................... 192/214.1 |
| 5,911,628 | * 6/1999 | Sudau et al. ............................ 464/24 |
| 5,931,735 | * 8/1999 | Schierling ............................... 464/24 |
| 6,058,801 | * 5/2000 | Schierling et al. .................. 74/573 F |

FOREIGN PATENT DOCUMENTS

| | | |
|---|---|---|
| PS 4 25 084 | 10/1924 | (DE) . |
| PS 897 188 | 11/1953 | (DE) . |
| GM 17 95 523 | 4/1959 | (DE) . |
| GM 18 1 8 286 | 8/1960 | (DE) . |
| OS14 75 600 | 1/1969 | (DE) . |
| 42 29 638 | 7/1997 | (DE) . |
| 0 015 739 | 9/1980 | (EP) . |
| 02 32 963 | 8/1987 | (EP) . |
| 14 15 095 | 11/1975 | (GB) . |
| 2 041 463 | 9/1980 | (GB) . |
| 2251284 | * 7/1992 | (GB) ...................................... 464/24 |

* cited by examiner

Primary Examiner—Lynne H. Browne
Assistant Examiner—Aaron M Dunwoody
(74) Attorney, Agent, or Firm—Henry M. Feiereisen

(57) ABSTRACT

A torsional vibration damper includes two modules which rotate relative to each other and a spring chamber which is sealed by providing the first module with a first guide surface which seals the spring chamber radially to the outside, and is spaced from the second module by a gap, with the first guide surface having an axial surface component facing the spring chamber, and by providing a second guide surface which has an axial surface component which faces the spring chamber and covers the gap on the spring chamber side.

154 Claims, 13 Drawing Sheets

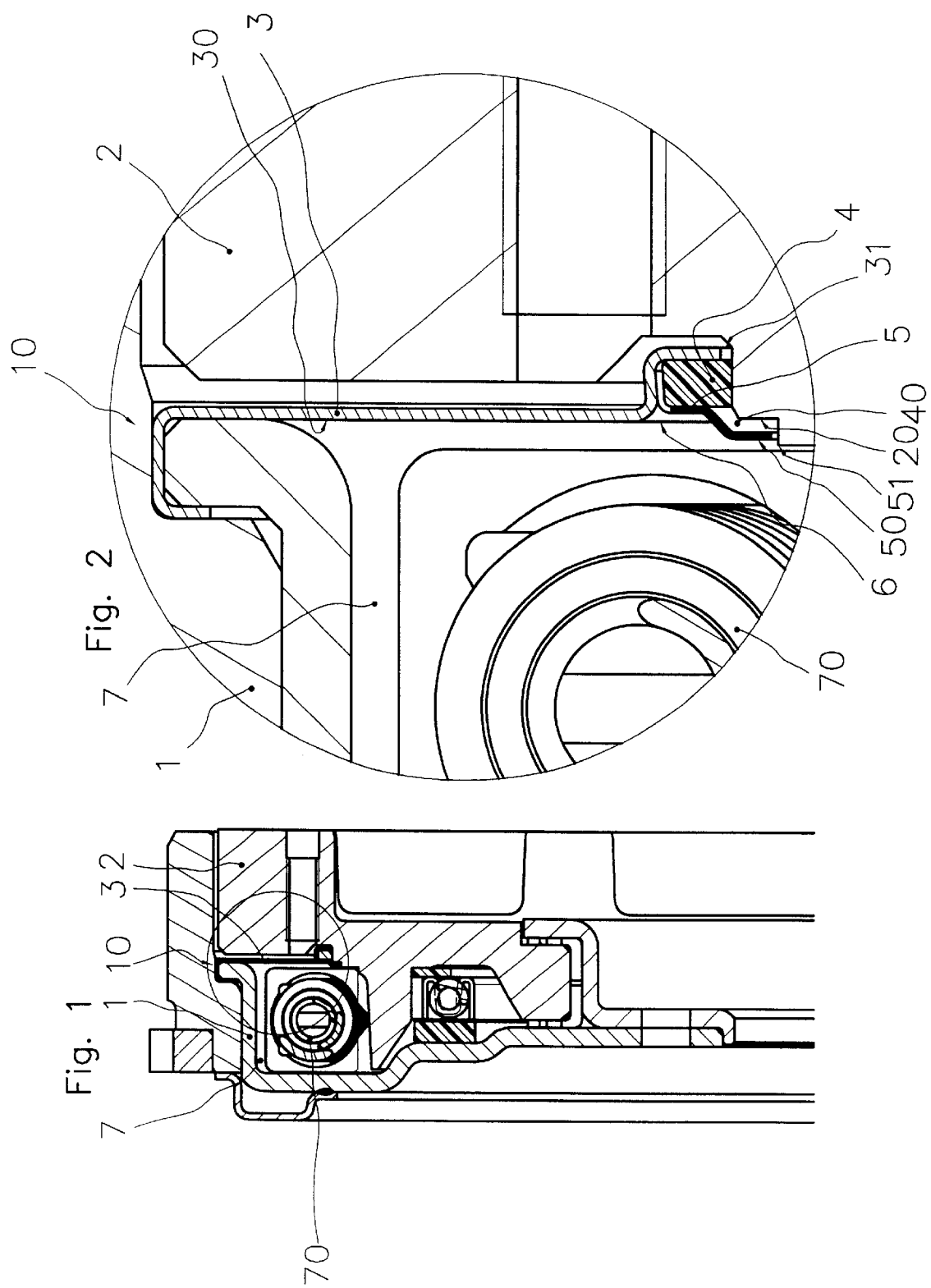

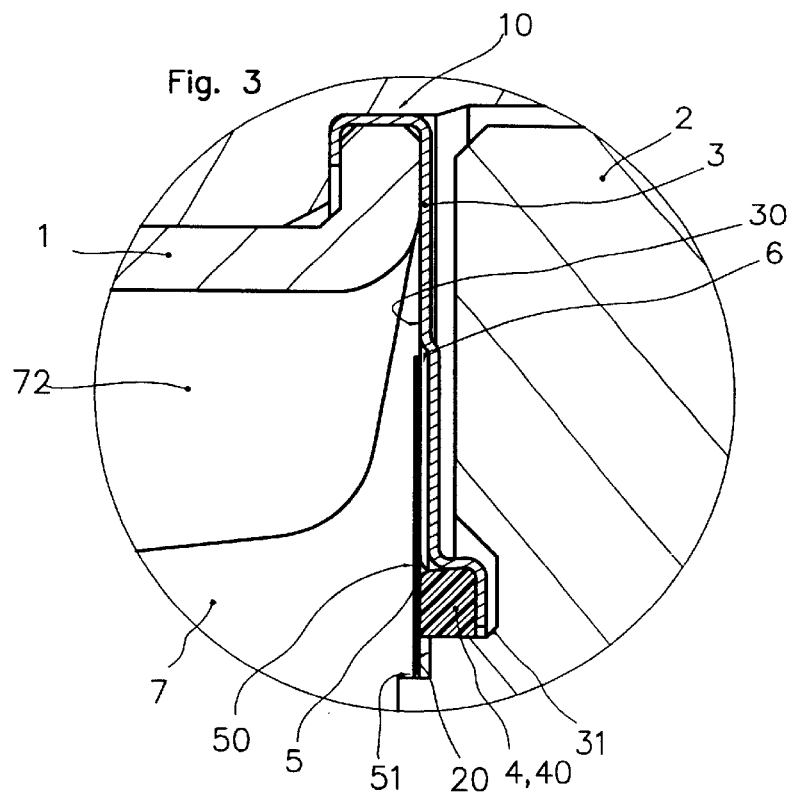
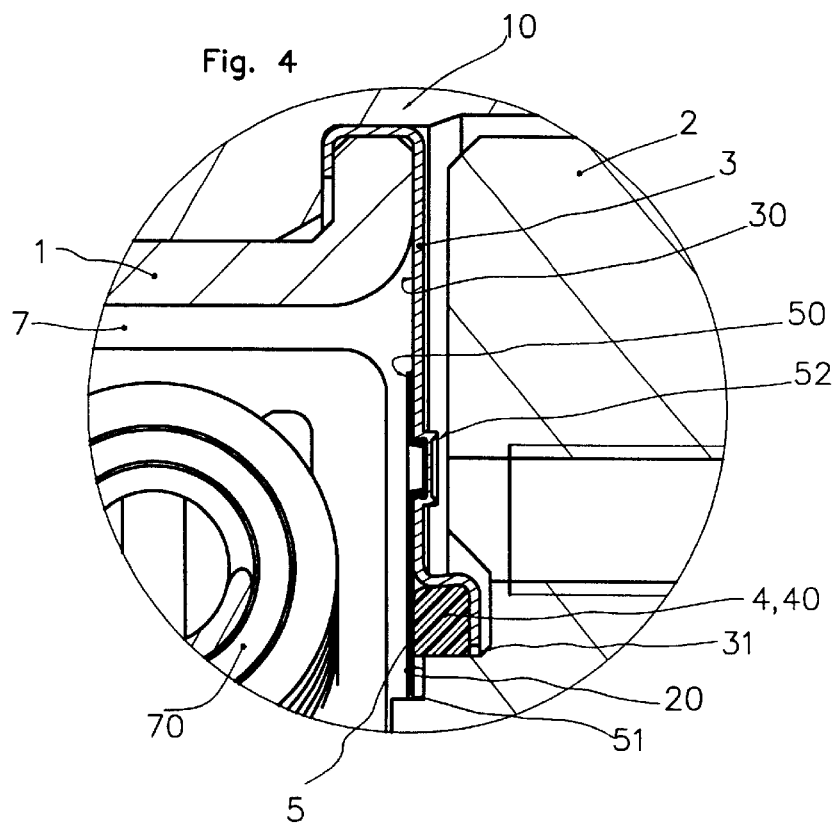

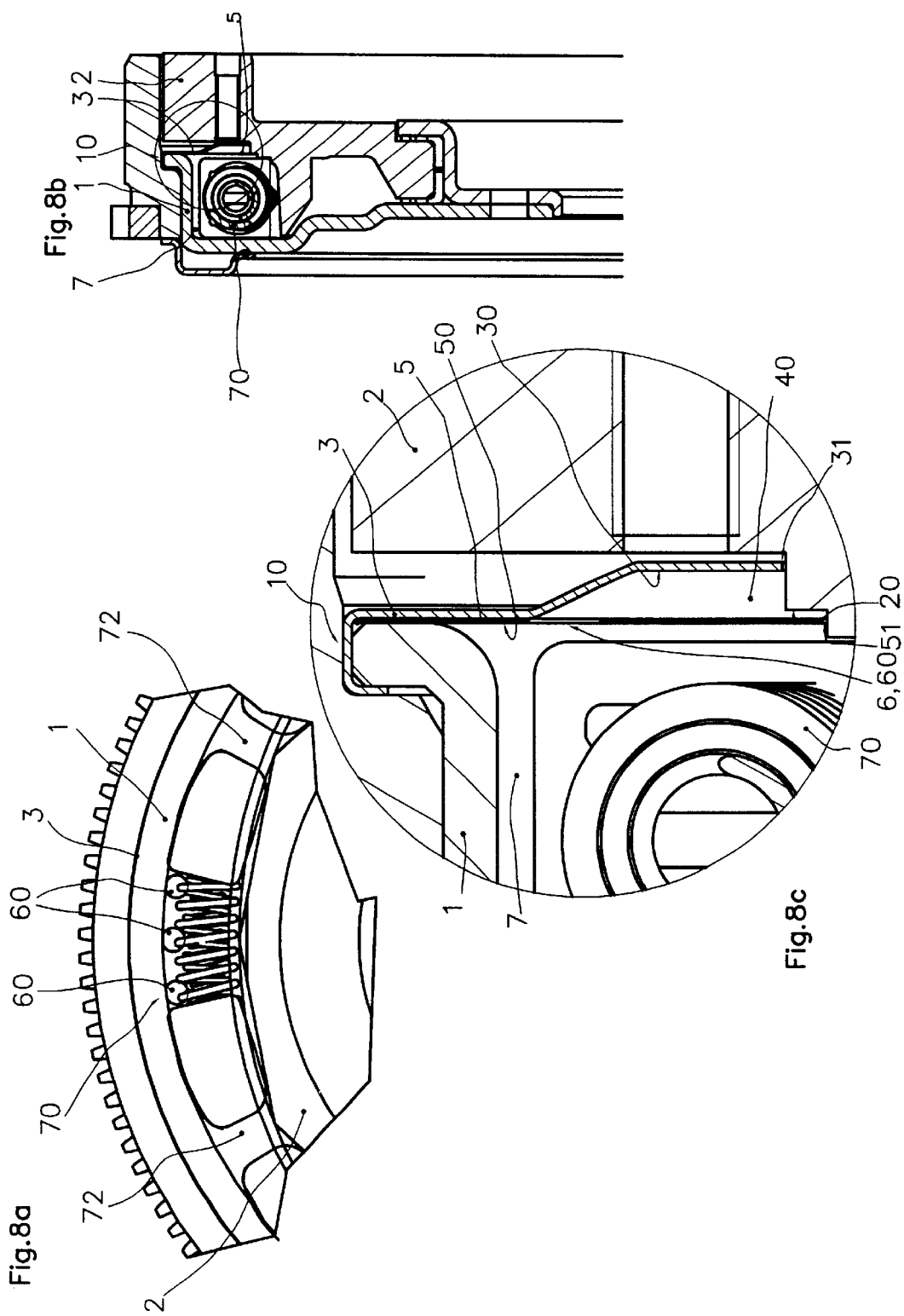

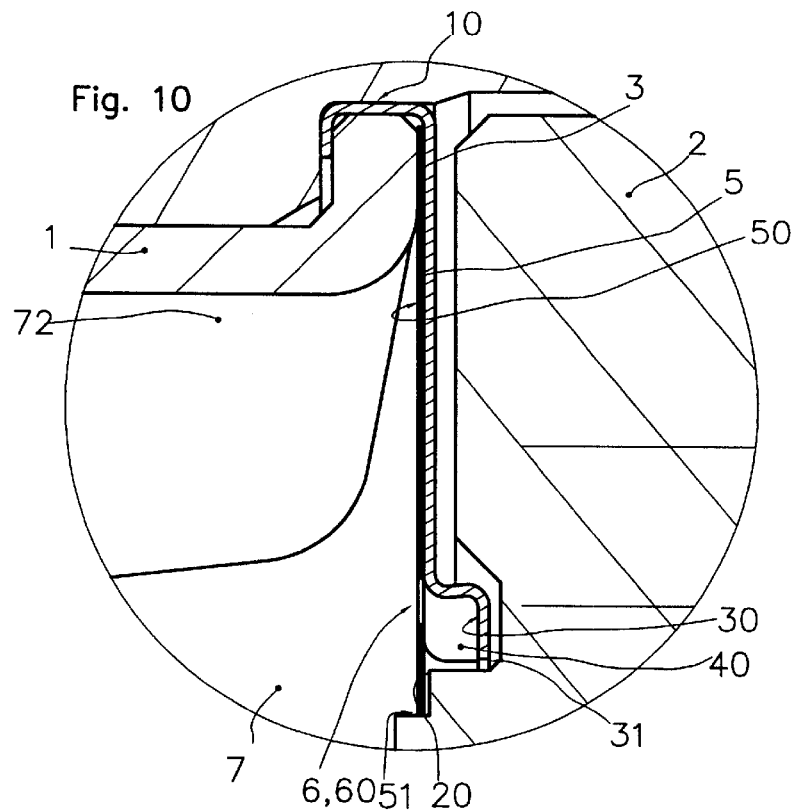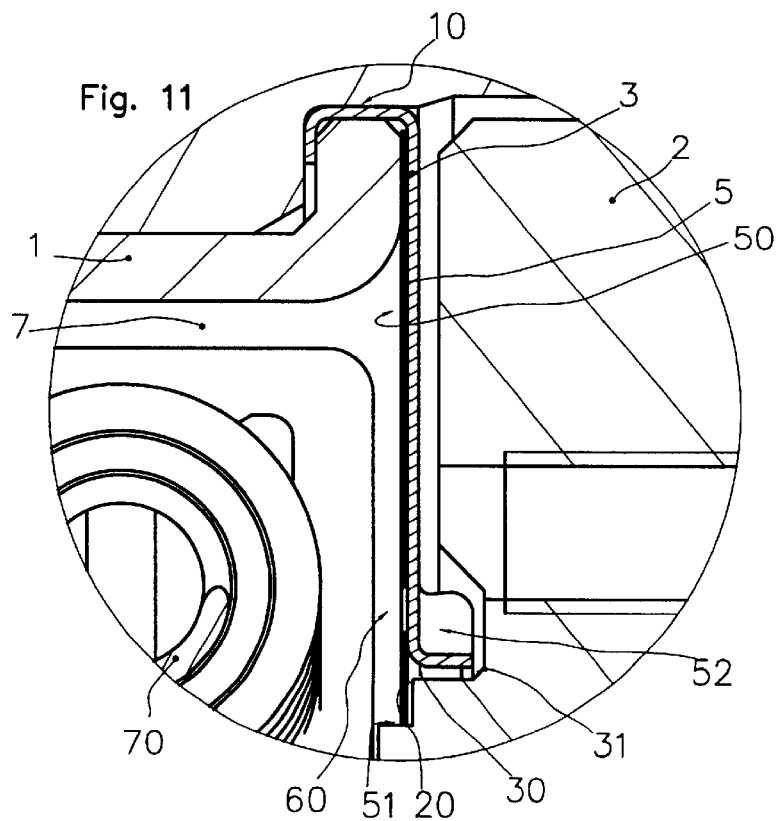

SEAL FOR A TORSIONAL VIBRATION DAMPER

BACKGROUND OF THE INVENTION

The invention concerns a torsional vibration damper with two components that rotate in relation to each other, and a spring chamber. In this spring chamber is usually at least one spring that acts tangentially between the two components, e.g. a spiral spring.

In the following, axial means a direction parallel to the main rotational axis of the torsional vibration damper, radial means a direction away from the main rotational axis in a plane perpendicular to the main rotational axis of the torsional vibration damper, and tangential means perpendicular to the two cited directions.

SUMMARY OF THE INVENTION

The problem of this invention is to present a generic torsional vibration damper where the spring chamber is sealed against the exit of lubricant, etc. such as grease.

As a solution, the invention suggests a generic torsional vibration damper where the first module has a first guide surface and seals the spring chamber radially outward, whereby the first guide surface is at a distance from the second module across a gap and is essentially radial, and an essentially radial second guide surface is provided that covers the gap (31) on the spring chamber side.

The invention is based on the idea that grease flows everywhere in the spring chamber, and when it contacts a wall, it experiences a centrifugal force that moves it radially outward. Grease that contacts guide surfaces is hence radially accelerated. Given the radial guide surfaces facing the spring chamber, the grease on a guide surface will be transported radially outward along the surface due to centrifugal force.

The second guide surface guarantees that grease splashing everywhere cannot pass through the gap between the first guide surface and second module since it is first captured by the second guide surface. Since the second guide surface is situated faces the spring chamber in regard to the gap and hence in regard to at least one area of the first guide surface, grease that leaves the second guide surface radially outward is at least captured by the first guide surface. The centrifugal force prevents this grease from accelerating radially inward toward the gap between the first guide surface and second guide surface.

Because of the gap between the first guide surface and second module, the spring chamber can be sealed without contact in the present invention. This arrangement accordingly does not advantageously influence the other properties of the torsional vibration damper, especially when it used for clutches.

The first guide surface can be a baffle that is fixed to the first module. Compared to the single-piece design of the first module and first guide surface, this arrangement is easier to manufacture. In particular, difficult undercuts can be avoided. Any type of suitable fastener can be used to connect the baffle and first module such as soldering, welding, rivets, etc.

It is easier to manufacture a torsional vibration damper according to the invention especially when the connection between the first module and the baffle is a clip connection. For example, the baffle can be bent as a clamp that opens easily due to the intrinsic elasticity of the material and grasps a projection of the first module.

In particular, the baffle can be in the shape of a washer. Usually, a generic torsional vibration damper has several tangential springs or spring chambers. With such an annular arrangement, the annular design of the baffle is particularly easy to mount since a corresponding baffle can be mounted in a single step for all spring chambers. Given the radial symmetry of this design, it is easy to design a clamp to connect the baffle with the first module.

In addition, the second guide surface can be designed as a guide disk. Such a guide disk can be easily placed over the gap between the first guide surface and second module on the spring chamber side. In particular, it is advantageous for the cited reasons to design the guide disk serving as a second guide surface in the shape of a washer.

The guide disk can be fixed to the first guide surface or the baffle. This fixed connection can e.g. be created by a clip connection, a rivet connection or a torx rivet connection. This fixed connection increases the stability of the unit formed by the disk and first guide surface or baffle. In particular, it is possible to create the guide disk out of a light and low-friction material such as plastic since the first guide surface or baffle serves to stabilize the guide disk. This arrangement also allows the guide disk and baffle to be premounted which makes it easier to manufacture a torsional vibration damper according to the invention.

There can be at least one opening facing the spring chamber between the first guide surface and second guide surface. Lubricant or grease can be returned to the spring chamber through this opening that has somehow reached behind the second guide surface, e.g. by creep. In particular, it is advantageous when the opening is situated so radially moving particles can pass through. In this case, particles behind the second guide surface are returned to the spring chamber.

There can be a calm space between the first and second guide surface close to the gap between the first guide surface and second module. Lubricant can collect in this area that has reached behind the second guide surface and is thus prevented from passing through the gap. Such a calm space is particularly advantageous when there is a corresponding opening in the radial exterior of the area through which the collected grease can return to the spring chamber.

Between the first and second guide surface, there can be an element (preferably a ring) made of absorbent material that covers the gap between the first guide surface and the second module, at least when the torsional vibration damper is still. Such an absorbent material can be any kind of material that can absorb and release the lubricant, etc. in the spring chamber. In particular, this material can be a felt-like sponge or foam. The material should have a greater capillary force than the gap. When this absorbent material covers the gap between the first guide surface and second module, grease, etc. is prevented from creeping through the gap. When the torsional vibration damper rotates, such creep is insignificant due to the centrifugal force. Hence this sealing ring can be designed so that, upon rotation, it raises from the second module or first guide surface due to centrifugal force to provide a contactless seal when the torsional vibration damper rotates. In particular, this seal can be in a calm space between the first and second guide surfaces.

In addition, it is advantageous when radial, external openings are provided between the first guide surface and second guide surface to the spring chamber. Lubricant collected in the sealing ring is transported by centrifugal force into the spring chamber.

It is especially possible to premount an arrangement consisting of the sealing ring, baffle and guide disk. For example, the baffle and guide disk can be fixed together as described above so that the sealing ring is suitably fixed between the guide disk and baffle.

The sealing ring can be held under radial, inward pretension of a guide disk comprising one of the two guide surfaces. The guide disk can be designed so that the pretension is preferably reduced to zero when the torsional vibration damper rotates. The guide disk can e.g. have axial projections that grip the sealing ring and press radially inward against the second module. The axial projections are dimensioned so that they move outward under centrifugal force when the torsional vibration damper rotates and hence release the sealing ring.

The second module of the torsional vibration damper according to the invention can be a third, essentially radial guide surface that covers an axial gap between the second guide surface and the second module on the side facing away from the spring chamber. Lubricant particles that may pass through a possibly existing axially-open gap between the second guide surface and the second module can hence be captured by the third guide surface and be transported radially outward on it. The gap between the first guide surface and the second module is advantageously axially further from the spring chamber than the third guide surface. If a particle transported on the third guide surface reaches the radial outer end of the third guide surface and is released radially from the end under centrifugal force, it cannot leave the spring chamber since the actual opening of the spring chamber, i.e., the gap between the first guide surface and second module is further removed in an axial direction from the spring chamber.

To cause the lubricant or grease to return into the spring chamber, there can be other guide surfaces in the spring chamber, especially close to the first guide surface, and/or in a calm area between the first and second guide surface; particles landing on the guide surfaces are accordingly deflected in a desirable direction when the torsional vibration damper rotates, preferably toward the spring chamber or the spring.

The torsional vibration damper can also have means to close the gap between the first module and second module depending on the angle of rotation between the first and second modules. These means can be designed so that the spring chamber is completely closed when a specific angle of rotation is attained between the two modules and the danger of splashed grease is the greatest. When the angle of rotation is slight or zero, the gap can be left open to provide a contactless seal of the spring chamber, at least at this site, and hence a slight amount of friction.

The closing means can comprise at least one projection that is moved axially upon a certain angle of rotation. The projection can be connected to a door that bridges the gap between the first module and second module when the projection moves axially. It is especially possible to also use an existing baffle as a door.

Any component of the torsional vibration damper can be used as a drive for the projection that causes the first module and second module to rotate in relation to each other. In particular, these projections can be on the first or second module. Particularly suitable are feather keys between which the springs are located.

Of course, the cited closing means can be advantageously used to seal a spring chamber independent of the cited features of the torsional vibration damper.

In addition, the torsional vibration dampers can have a grease transport system actuated by centrifugal force. The grease is sprayed in every direction in the spring chamber during operation. Usually, however, the grease is only required at certain areas in the spring chamber. When a grease transportation system according to the invention is provided, the grease distributed in the spring chamber can be returned to the desired positions.

The grease transport system advantageously has a grease collector that is radially inward and a grease dispenser that is radially further out. Means are provided between the grease dispenser and grease collector to move the grease peripherally along its path from the grease dispenser to the grease collector. While the grease automatically moves radially under centrifugal force, the moving means according to the invention allow the grease to be intentionally transported in a peripheral direction.

Any surface of the torsional vibration damper can serve as the grease collector according to the invention. In particular, the grease can be collected through gaps or openings, e.g. through a gap behind a guide surface.

The moving means according to the invention can e.g. be structures formed on a surface with radial components such as deflectors that deflect particles such as grease particles in a peripheral direction when they are moved radially outward by centrifugal force.

Of course the described grease transport system can be advantageously used independent of the other features in a torsional vibration damper in which grease is only required at certain cites.

BRIEF DESCRIPTION OF THE DRAWING

Other advantages, properties and goals of the present invention are found in the drawings to the following description in which are portrayed ten exemplary embodiments of torsional vibration dampers according to the invention. The drawing shows in:

FIG. 1 a section of a first embodiment of a torsional vibration damper according to the invention;

FIG. 2 a cutaway view of FIG. 1;

FIG. 3 a section of a second embodiment of the torsional vibration damper according to the invention at a projection in a first module;

FIG. 4 the torsional vibration damper of FIG. 3 in a representation similar to FIG. 2;

FIG. 8a a section of another variation of the fourth torsional vibration damper;

FIG. 8b the variation from FIG. 8a in a representation similar to FIG. 1;

FIG. 8c the variation from FIGS. 8a and 8b in a representation similar to FIG. 2;

FIG. 10 a sixth embodiment of a torsional vibration damper according to the invention in a representation similar to FIG. 3;

FIG. 11 the torsional vibration damper from FIG. 10 in a representation similar to FIG. 2;

DETAILED DESCRIPTION OF PREFERRED EMBODIMENTS

Figure 5:
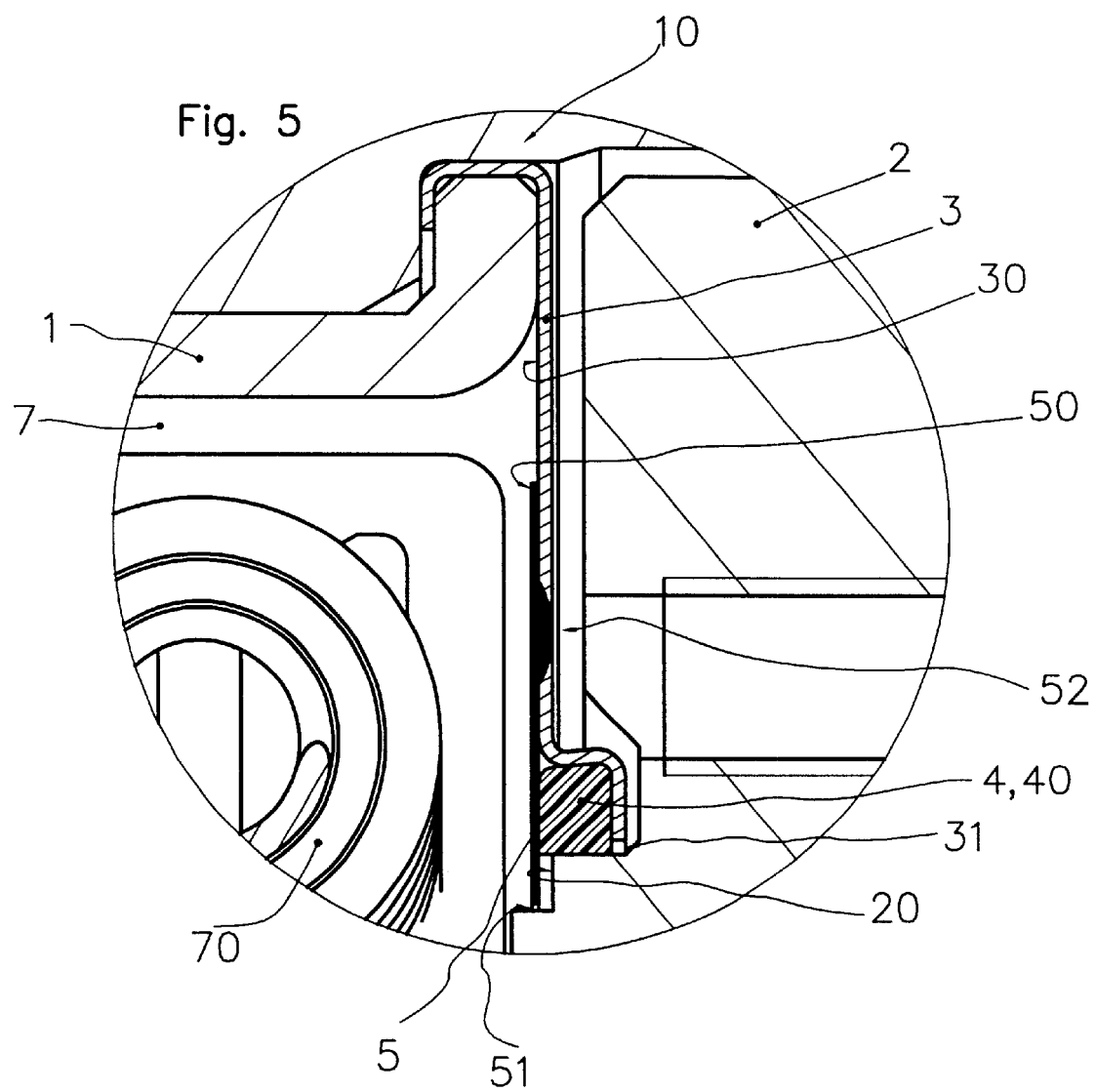
FIG. 5 a third embodiment of a torsional vibration damper in a representation similar to FIG. 2.

The first embodiment (FIGS. 1 and 2) of the torsional vibration damper according to the invention of has a first module 1 and a second module 2 that rotate in relation to each other. The two modules 1 and 2 abut a spring chamber 7 in which is located a spring arrangement 70. The spring arrangement 70 acts tangentially between the two modules 1 and 2, and the first module 1 has projections 72 that interact with feather keys 71 of the spring arrangement 70.

Clipped onto the first module 1 is a disk-shaped baffle 3 (clip connection 10) that has a first guide surface 30 and is at a distance from the second module 2 across a gap 31.

In addition, the torsional vibration damper has a washer-shaped guide disk 5 that is attached to the baffle 3. This guide disk 5 is at a distance from the second module 2 across a gap 51 and has a second guide surface 50.

Behind the guide disk 5 or the second guide surface 50 is a calm area 40 that is partially filled by a sealing ring 4. The sealing ring 4 abuts the second module 2 and covers the axial gap 31 between the first guide surface 30 and the second module 2. In this exemplary embodiment, the sealing ring 4 consists of felt.

On the exterior radial side of the calm area 40 are openings 6 between the first guide surface 30 and the second guide surface 50 or between baffle 3 and guide disk 5.

On the side of the gap 51 facing away from the spring chamber 7 between the second module 2 and second guide surface 50 is a third guide surface 20.

Each of the three guide surfaces 30, 50 and 20 have an axial surface component that faces the spring chamber. When the torsional vibration damper rotates, particles on the guide surfaces 30, 50 and 20 move radially outward and remain in the spring chamber 7. Particles that pass through the gap 51 are conveyed on the third guide surface 20 into the calm area 40 and pass from under centrifugal force with the particles in the sealing ring onto the first guide surface 30 and through the opening 6 back into the spring chamber 7. Particles on the second guide surface 50 are conveyed radially outward and reach the first guide surface 30 by centrifugal force.

The sealing ring 4 is selected so that it raises from the second module upon a desired speed of the torsional vibration damper. This provides a contactless seal of the spring chamber 7 at this and higher speeds.

The second embodiment (FIGS. 3 and 4) of the torsional vibration damper essentially corresponds to the first embodiment. The second embodiment has an essentially planar guide disk 5 that fits positively with the baffle 3 via several recesses (connections 52).

Between the connecting sites 52 are radial, long recesses for the baffle 3 that form the openings 6.

The third embodiment (FIG. 5) has nearly the same design and differs only in that a spot weld is provided at the connection site 52. Alternately, a lens-shaped recess can be provided in the baffle 3 in which fits a corresponding projection of the guide disk 5.

Figure 6A:
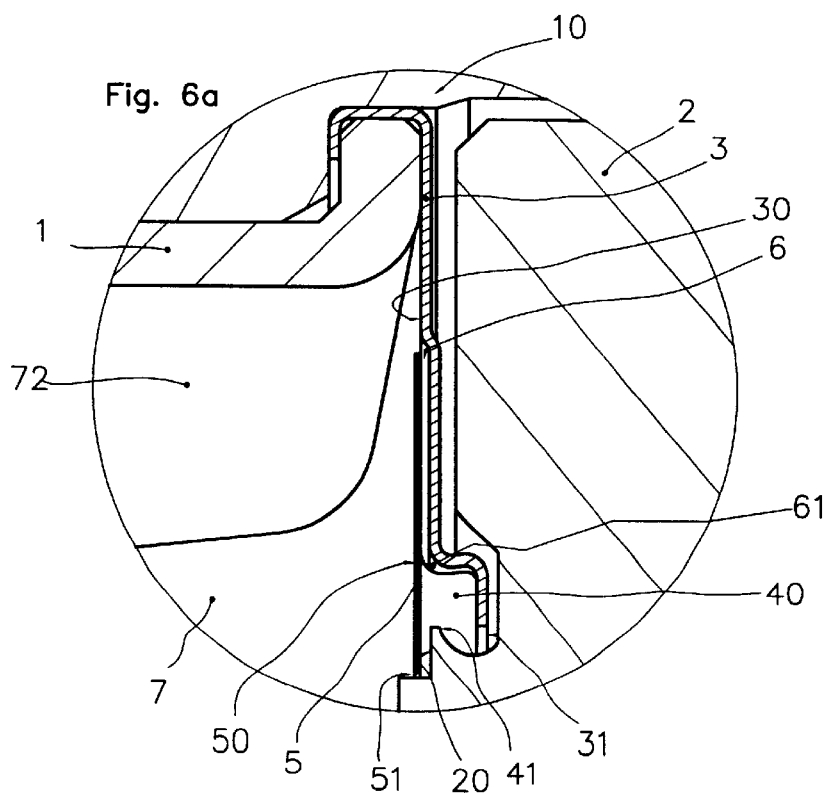
FIG. 6a a fourth embodiment of a torsional vibration damper in a representation similar to FIG. 3.
Figure 6B:
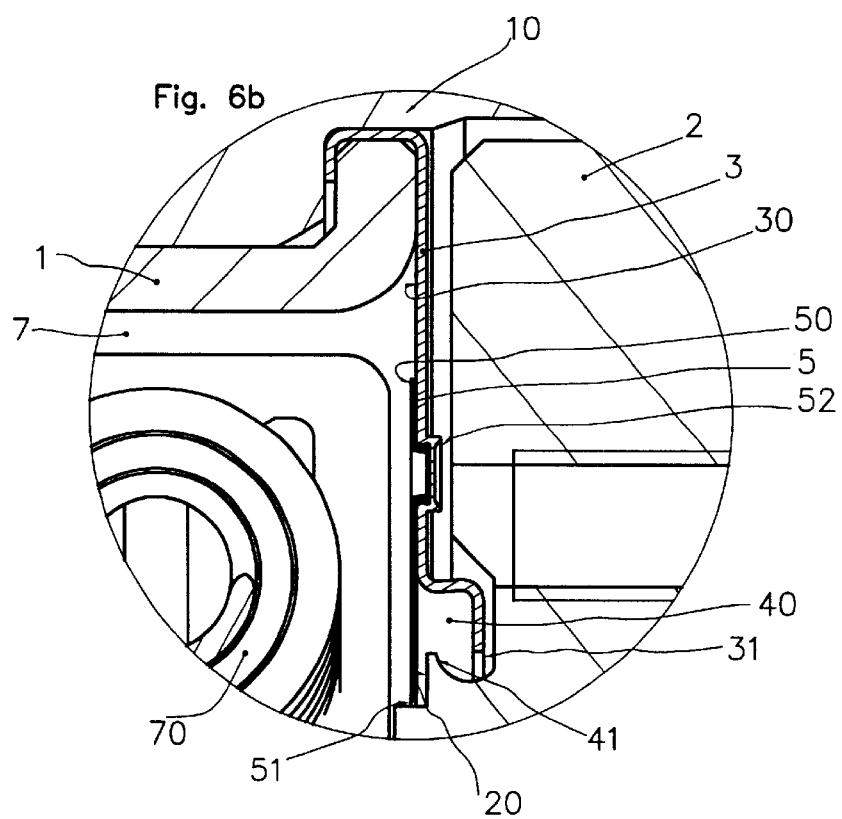
FIG. 6b a torsional vibration damper of FIG. 6 in a representation similar to FIG. 2.

The fourth embodiment (FIGS. 6a and 6b) also essentially correspond to the second embodiment. However, there is no sealing ring. Instead, the second module 2 has a concave guide surface 41 that extends from the gap 31 between the second module 2 and the first guide surface 30 into the calm area 40, and an extension contacts the third guide surface 20. When the torsional vibration damper rotates, particles on the third guide surface 20 or the concave guide surface 41 are transported to the extension to be conveyed radially into the calm area 40 on the first guide surface after correspondingly overcoming the adhesion force.

An angled deflection surface 61 is provided in a peripheral direction on both sides of each opening 6 in this embodiment, and this prevents or reduces the collection of grease in the calm area 40 on surfaces parallel to the rotational axis. These deflection surfaces 61 have an axial surface component and deflect grease in a peripheral direction.

Figure 7A:
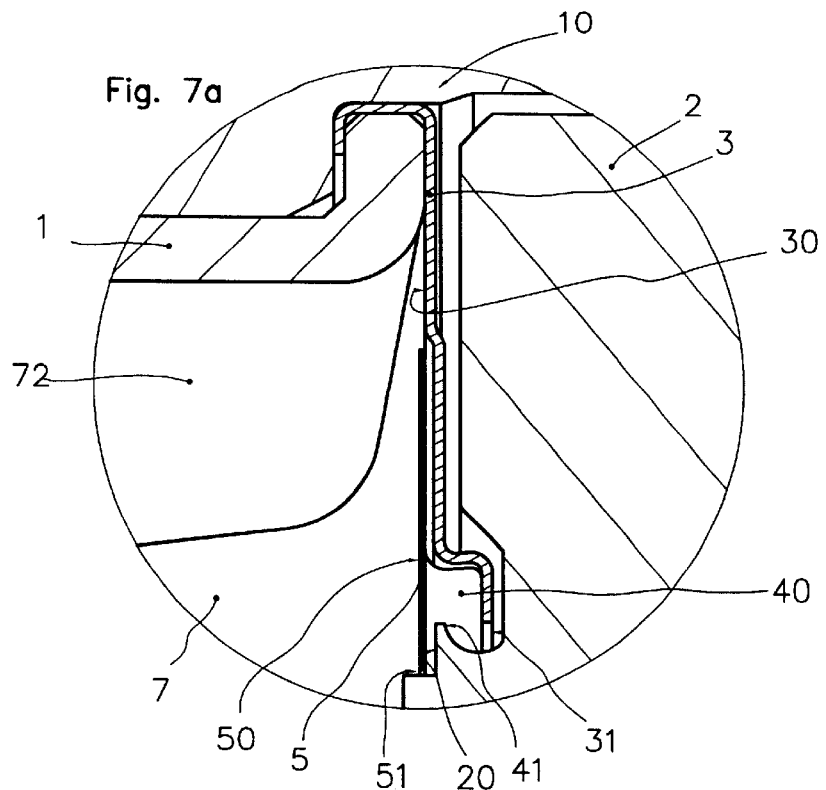
FIG. 7a a variation of the forth torsional vibration damper in a representation similar to FIG. 3.
Figure 7B:
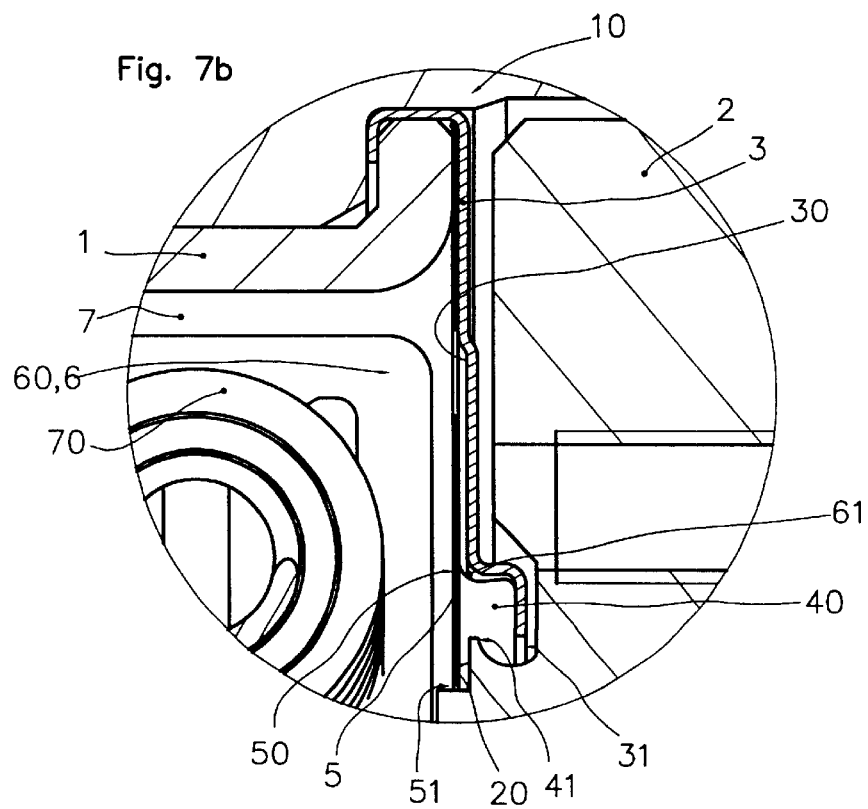
FIG. 7b the variation from FIG. 7a in a representation similar to FIG. 2.

A first variation of the fourth embodiment is shown in FIGS. 7a and 7b. While in the fourth embodiment the openings 6 are at the height of the projections 72 of the first module 1, the openings 6 are at the height of the springs 70 in this variation. Depending on the existing requirements, the grease is accordingly transported to the desired location.

In this first variation, the guide disk 5 is planar and has an outer radius that approximately corresponds to the outer radius of the baffle 3. The guide disk 5 can accordingly be attached together with the baffle 3 to the first module 1 by clips 10, and it is particularly easy to mount this embodiment. In the guide disk 5 are holes 60 at the height of the radial outward side of the calm area 40 that form the openings 6 through which grease is removed.

A second variation shown in 8a–8c has an enlarged, annular calm area 40 in contrast to the first variation.

In addition, three holes 60 are in the guide disk 5 at the height of the spring arrangement 70 instead of the one hole 60 in the first variation. In this second variation, deflection surfaces are not used, and the grease is merely transported by a suitable arrangement of the holes 60. In this variation, the grease displacement means comprise three holes 60 and the first guide surface 30 (on which the grease collects until it is removed through the holes 60).

Figure 9A:
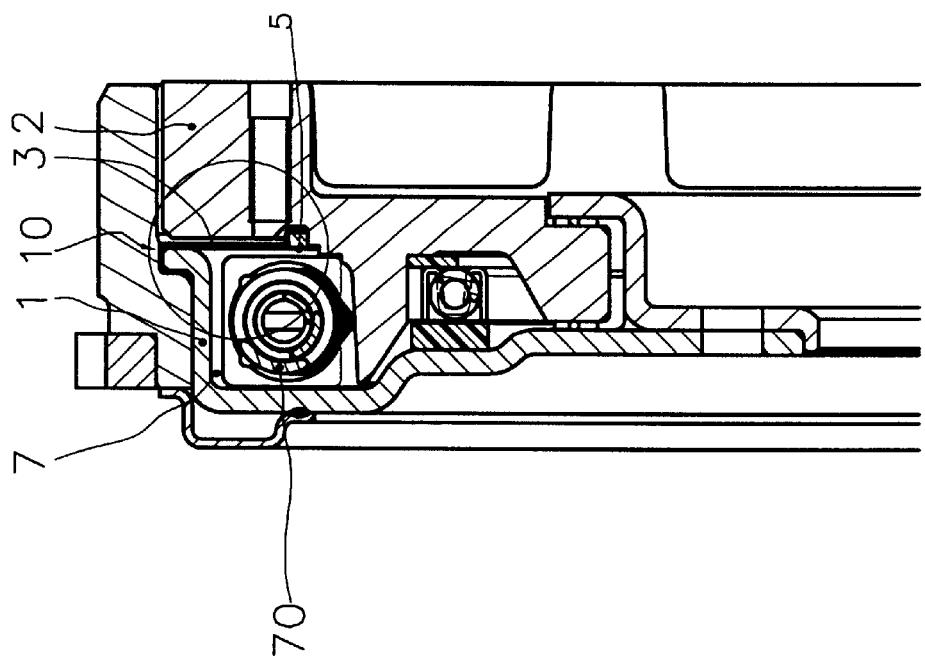
FIG. 9a a fifth embodiment of a torsional vibration damper according to the invention in a representation similar to FIG. 1.
Figure 9B:
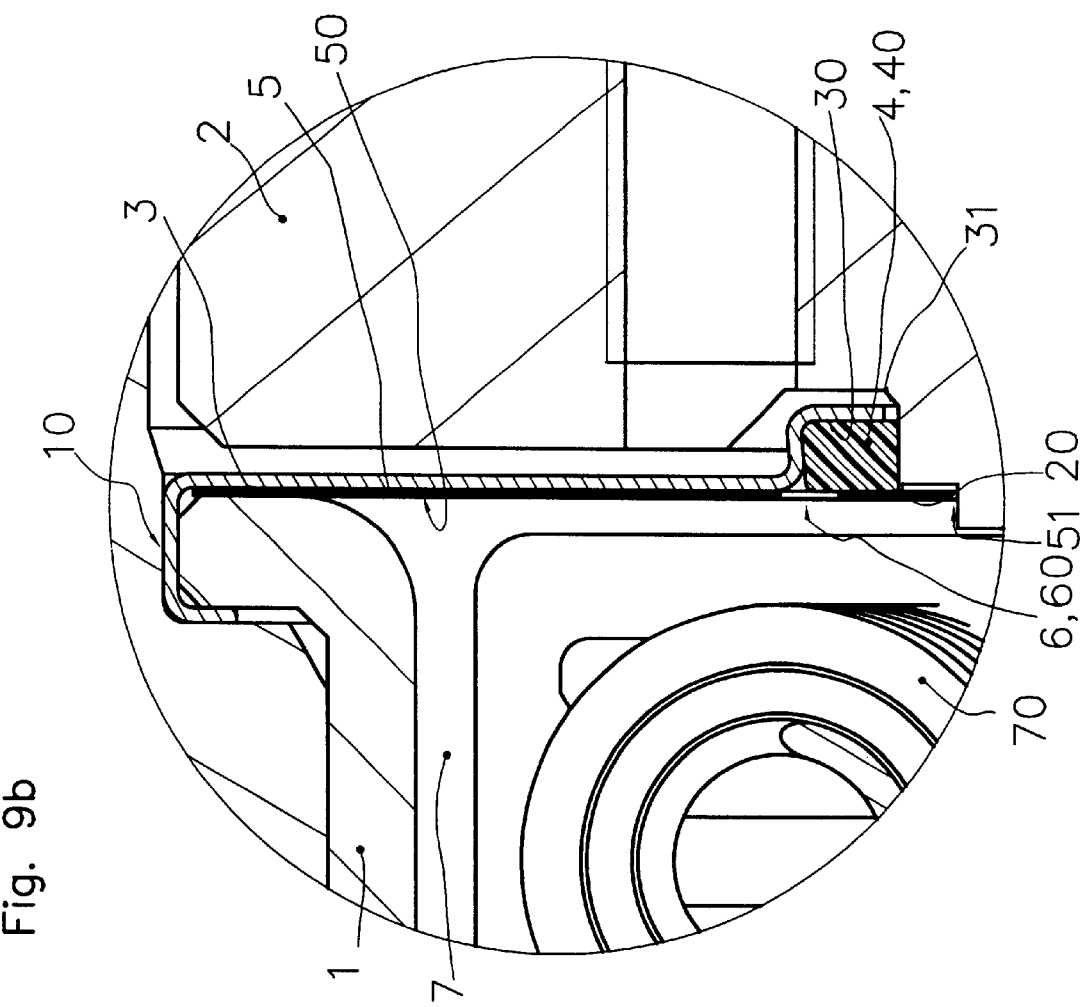
FIG. 9b the torsional vibration damper variation from FIG. 8 in a representation similar to FIG. 2.

The fifth embodiment (FIGS. 9a and 9b) of a torsional vibration damper according to the invention also essentially corresponds to the cited embodiments. There is a sealing ring 4 in this fifth embodiment, however.

In contrast to the fifth embodiment, there is no sealing ring in the sixth embodiment (FIGS. 10 and 11). In addition, the calm area 40 is not a continuous ring but is rather divided into chambers. Between these chambers are bars to which the baffle 3 and guide disk 5 are also connected. Holes 60 are used for these connections that serve as openings 6 at the height of the calm area 40 between the baffle 3 and second guide surface 50. In this embodiment, the high stability of the guide disk 5 is guaranteed so that a less stable material can be used as the guide disk 5.

Figure 12:
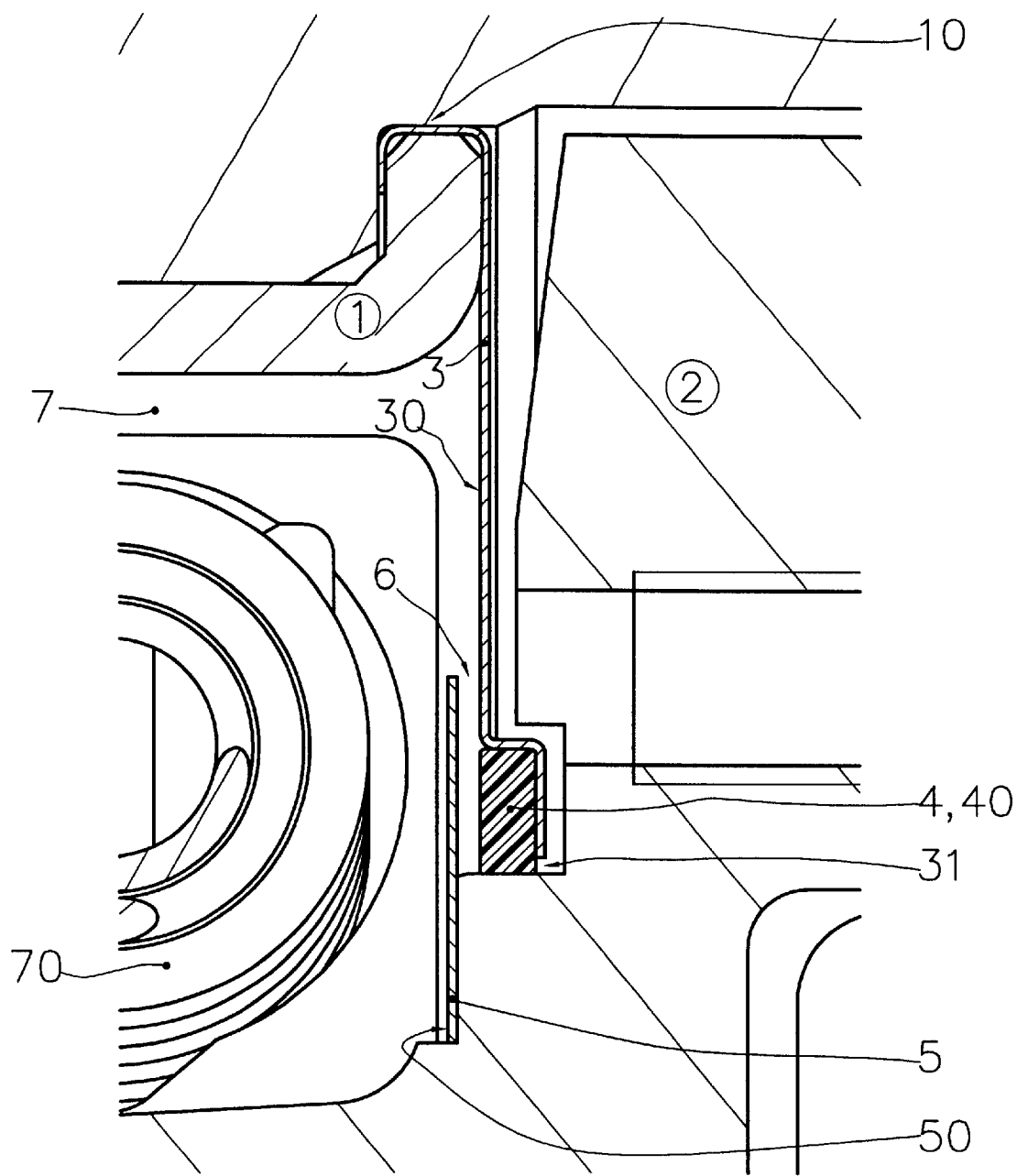
FIG. 12 a seventh embodiment of a torsional vibration damper according to the invention in a representation similar to FIG. 2.

In the seventh embodiment (FIG. 12), the guide disk 5 is not connected to the baffle 3 but is placed on the second module 2. The guide disk 5 rotates together with the second module 2 in this embodiment. The opening 6 is formed by an axial gap between the baffle 3 and guide disk 5.

Figure 13:
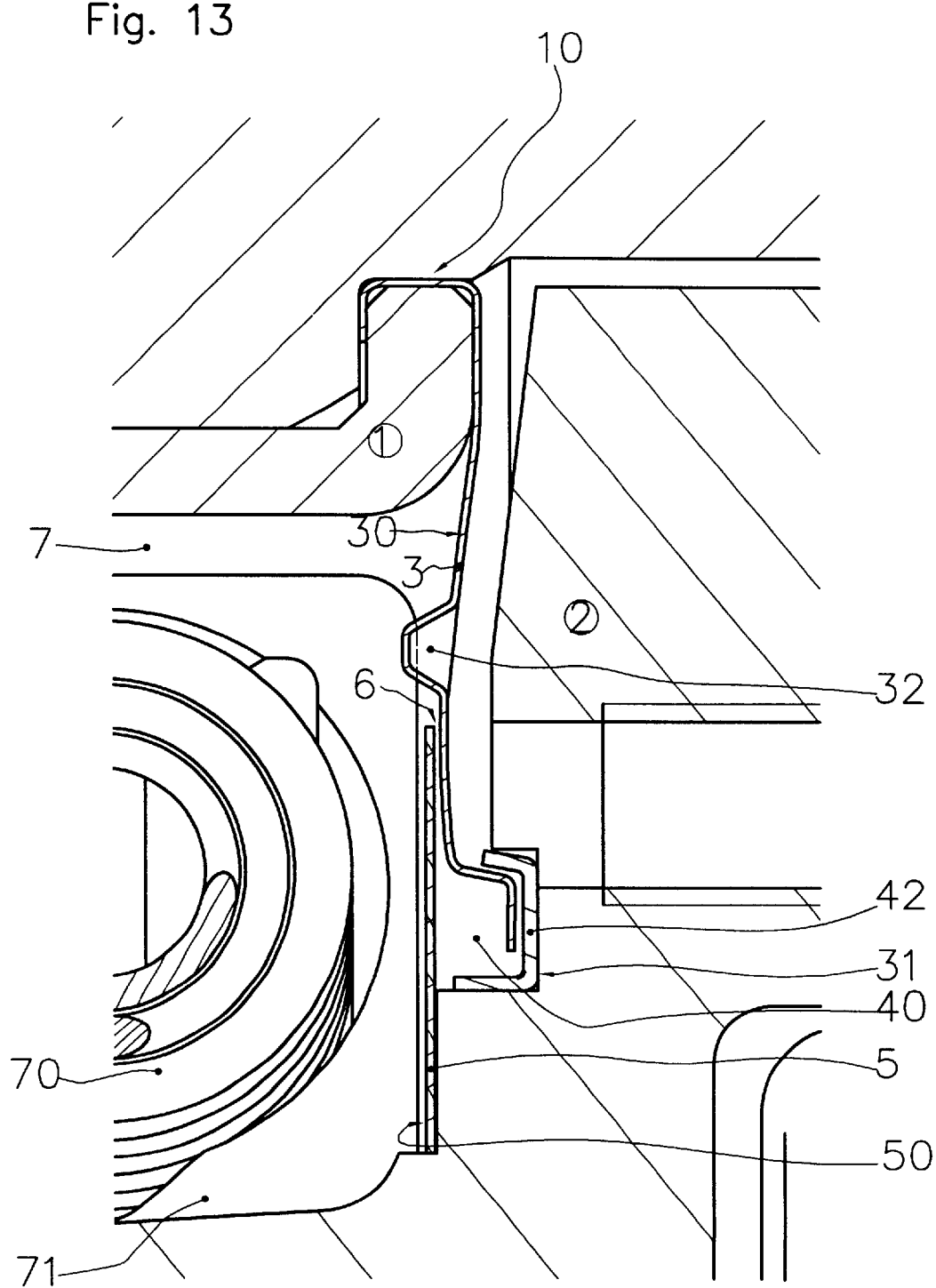
FIG. 13 an eighth embodiment of a torsional vibration damper according to the invention in a representation similar to FIG. 2.
Figure 14:
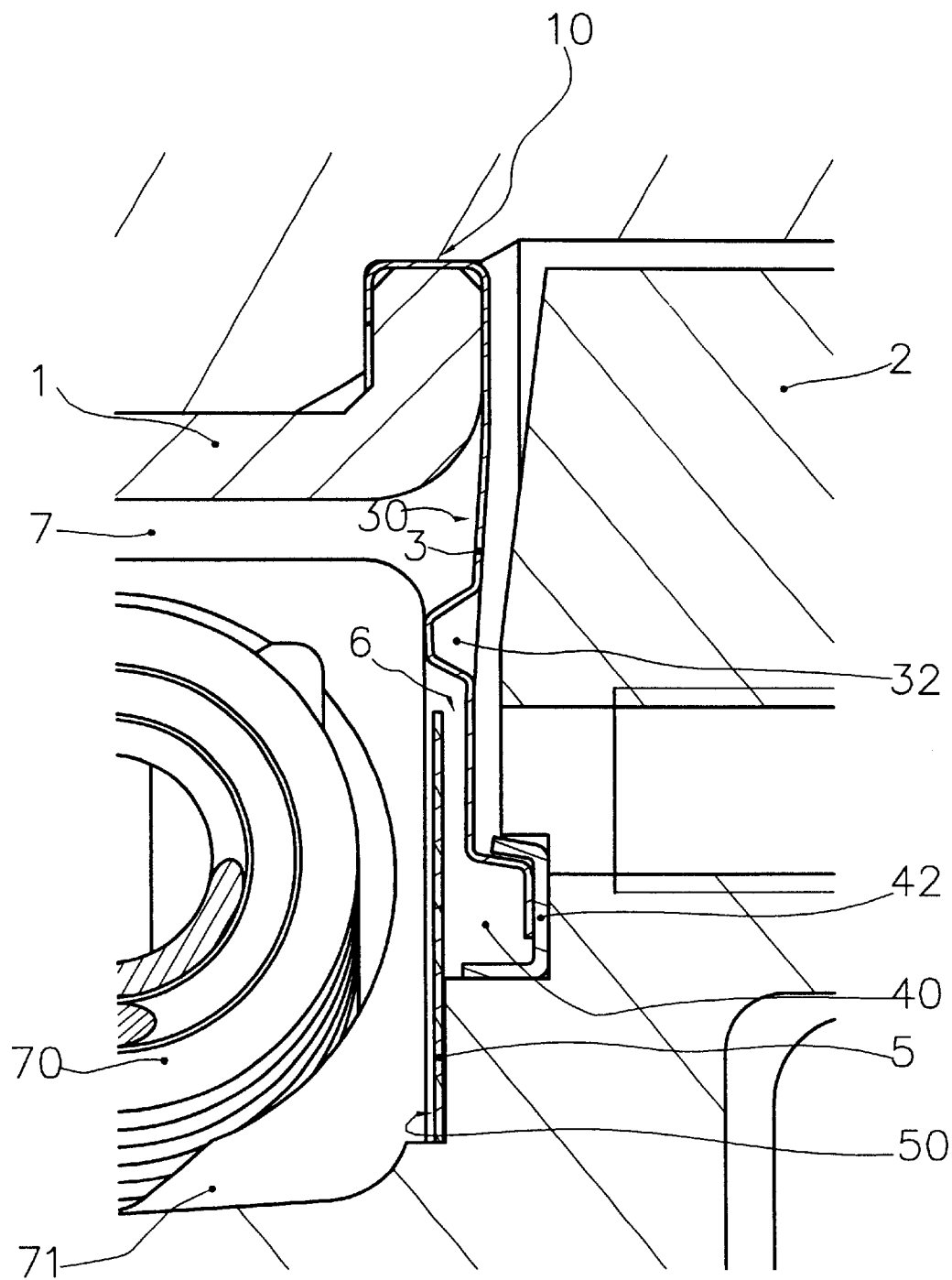
FIG. 14 the torsional vibration damper from FIG. 13 in another operating position.

The guide disk 5 is also on the second module 2 in the eighth embodiment (FIGS. 13 and 14), and is at a distance from the baffle 3 across opening 6. In this embodiment, the baffle 3 has projections 32 that interact with feather keys 71 on the ends of the springs 70 in such a manner that the projections 32 are moved by a feather key 71 toward the second module 2 when the spring 70 is compressed, i.e., the second module 2 is moved relative to the first module 1. As a result of this movement, the baffle 3 is pressed against a seal 42 that is provided on the second module 2. The spring chamber 7 is completely sealed when the spring 70 is compressed to avoid the danger of flying grease. When the spring is not compressed or only compressed slightly, a contactless seal of the spring chamber 7 is provided.

Figure 15:
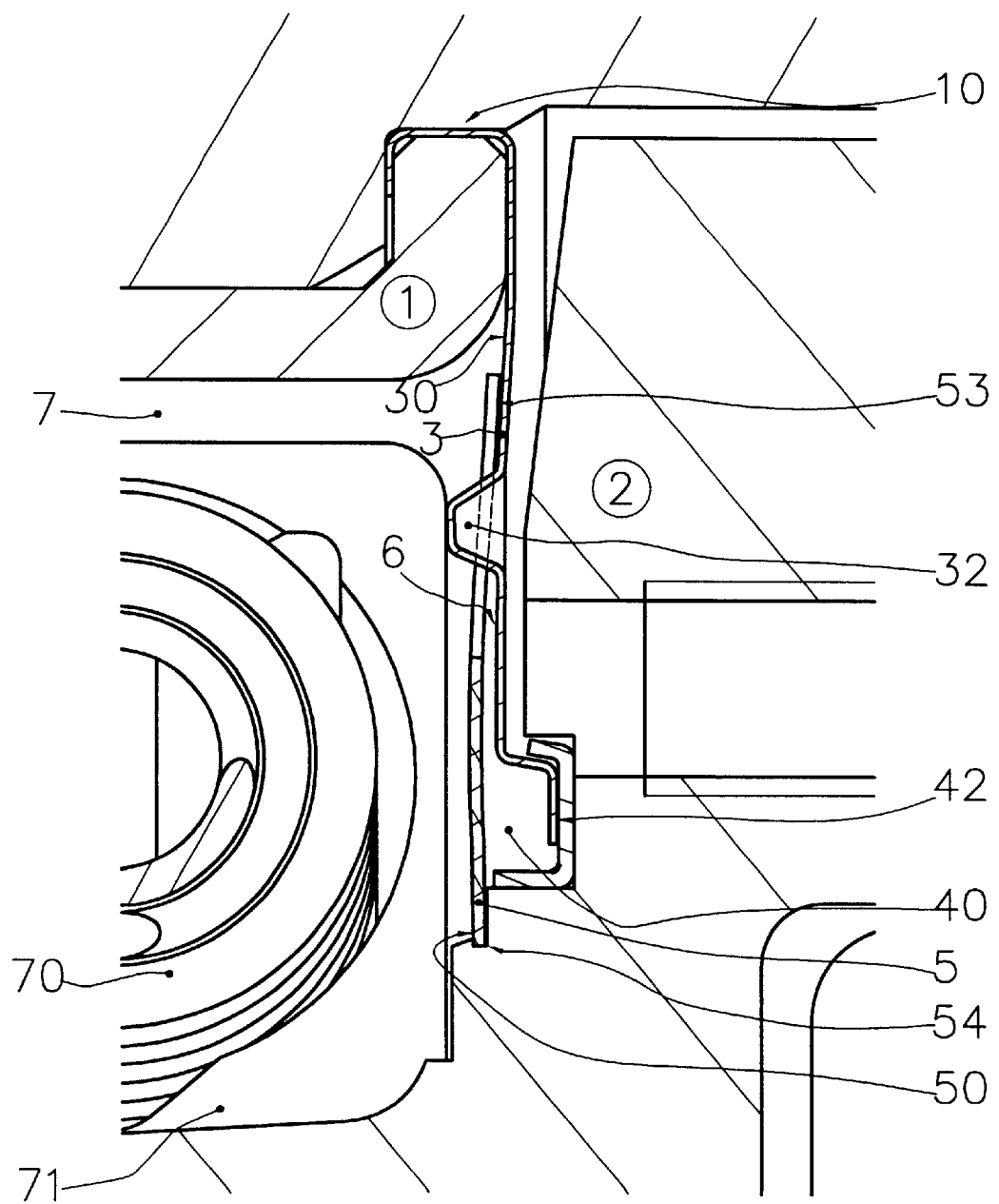
FIG. 15 a ninth embodiment of a torsional vibration damper according to the invention in a representation similar to FIG. 2.
Figure 16:
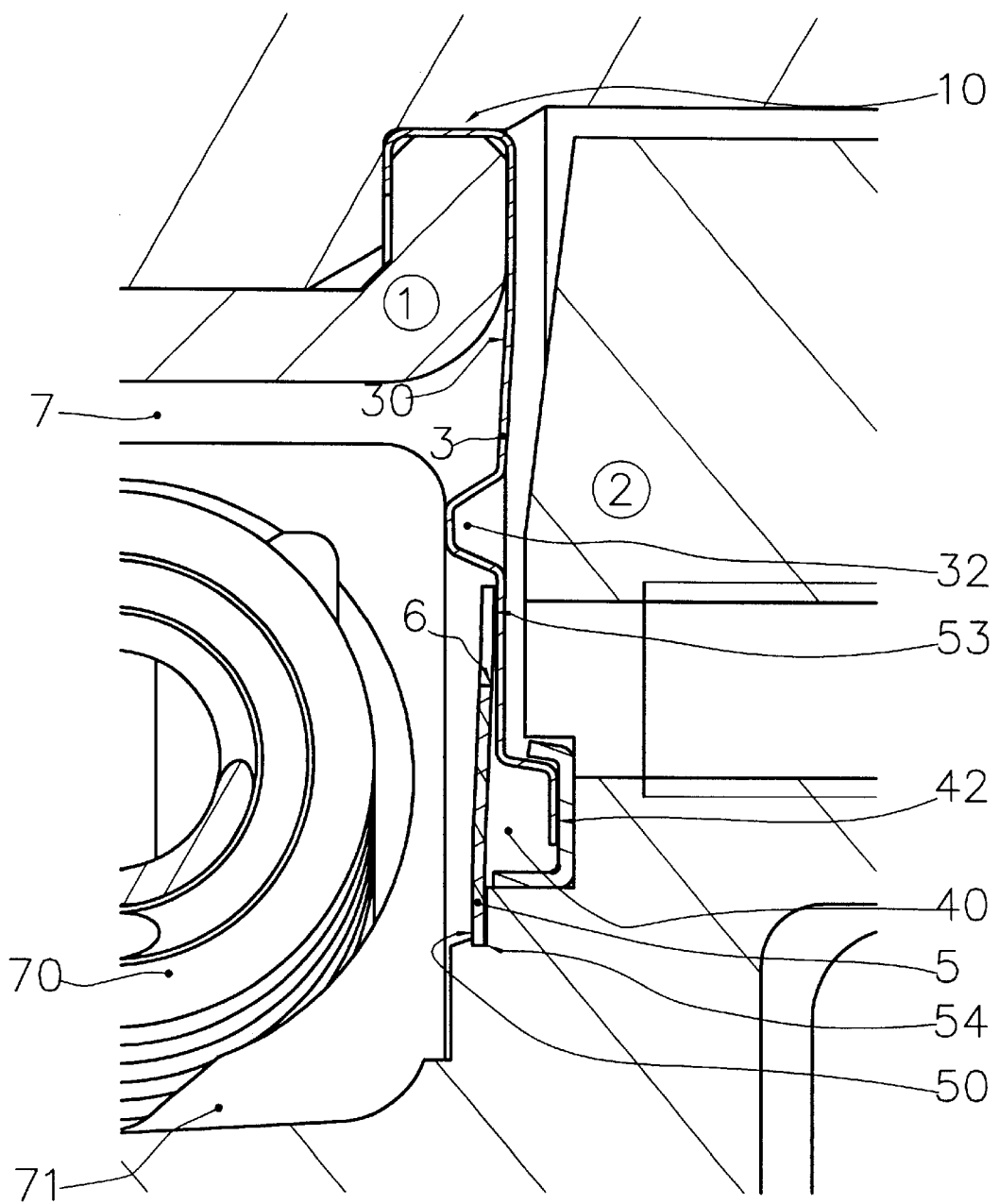
FIG. 16 a tenth embodiment of a torsional vibration damper according to the invention in a representation similar to FIG. 2.

In the ninth and tenth embodiments (FIGS. 15 and 16), the baffle 3 is continuously pressed against the seal 42. The force necessary for this is provided by fingers 53 of the guide disk 5. To ensure a stable seat of the guide disk 5 despite the axial force, the guide disk 5 is attached with a clip 54 to the second module 2. The baffle 3 hence glides continuously across the seal 42 in the ninth and tenth embodiment. When modules 1 and 2 execute a relative movement in relation to each other, the feather key 71 acts via the projection 32 on the baffle 3 and reinforces the sealing force of the baffle on the seal 42. The ninth and tenth embodiments differ by the radial distances of the contact point of the fingers 53 on the baffle 3. The resulting force, especially on the second module 2, can accordingly be regulated. When the second module 2 is used as a coupling flange of a clutch, the fingers 53 can be designed to cause the resulting force to act in the direction of the actuating force of the clutch.

What is claimed is:

1. A torsional vibration damper, comprising two modules (1, 2) that rotate in relation to each other, and a spring chamber (7), said first module (1) having a first guide surface (30) and sealing the spring chamber (7) radially outward, whereby the first guide surface is at a distance from the second module (2) across a gap (31) and is essentially radial, and further comprising an essentially radial second guide surface (50) which covers the gap (31) on the spring chamber side, wherein the first guide surface (30) is a baffle (3) that is fixed to the first module (1).

2. A torsional vibration damper according to claim 1 wherein the baffle (3) is in the shape of a washer.

3. A torsional vibration damper according to claim 1 wherein the second guide surface (50) is designed as a guide disk (5).

4. A torsional vibration damper according to claim 3 wherein the guide disk (5) is in the shape of a washer.

5. A torsional vibration damper according to claim 3 wherein the guide disk (5) is fixed to the first guide surface (50).

6. A torsional vibration damper according to claim 3 wherein between the first guide surface (30) and the second guide surface (50) there is provided at least one opening (6) that faces the spring chamber (7).

7. A torsional vibration damper according to claim 6 wherein the opening (5) is situated so that a particle moving radially can pass through.

8. A torsional vibration damper according to claim 1 wherein there is provided a calm area (40) between the first and second guide surfaces (30, 50) close to the gap (31) situated between the first guide surface (30) and the second module (29).

9. A torsional vibration damper according to claim 8 wherein the calm area (40) has an opening extending radially outward that leads to the spring chamber.

10. A torsional vibration damper according to claim 1 wherein between the first and second guide surfaces (30, 50) there is provided a sealing ring (4) that covers the gap between the first guide surface (30) and the second module (2) at least when the torsional vibration damper is at rest.

11. A torsional vibration damper according to claim 10, and further comprising a guide disk for holding the sealing ring (4) under radial, inward pretension, said guide disk forming one of the two guide surfaces and so designed that the pretension is reduced when the torsional vibration damper rotates.

12. A torsional vibration damper according to claim 11 wherein the guide disk is so designed that the pretension is reduced to zero when the torsional vibration damper rotates.

13. A torsional vibration damper according to claim 1 wherein the second module (2) has a third, essentially radial guide surface (20) that covers an axial gap (51) between the second guide surface (50) and the second module (2) on the side facing away from the spring chamber (7).

14. A torsional vibration damper according to claim 13 wherein the gap (31) between the first guide surface (30) and second module (2) is further removed in an axial direction from the spring chamber than the third guide surface (20).

15. A torsional vibration damper according to claim 1, and further comprising sealing means (3, 32, 42) for sealing a gap between the modules (1, 2) depending on an angle of rotation between the first module (1) and the second module (2).

16. A torsional vibration damper according to claim 15 wherein the sealing means (3, 32, 42) comprise at least one projection (32) that is moved axially upon a certain angle of rotation.

17. A torsional vibration damper according to claim 1, and further comprising a grease transporting system activated by centrifugal force.

18. A torsional vibration damper according to claim 17 wherein the grease transporting system has a grease collector arranged radially inwardly a grease dispenser that is radially further out, and means provided between the grease dispenser and grease collector for moving the grease along its path from the grease dispenser to the grease collector in a peripheral direction.

19. A torsional vibration damper according to claim 18 wherein the grease collector is formed by a gap (51) directed behind a guide surface (5).

20. A torsional vibration damper according to claim 18 wherein the grease dispenser is formed by at least one opening (6) or a hole (60).

21. A torsional vibration damper according to claim 1 wherein the gap is disposed at a level of the spring chamber.

22. A torsional vibration damper according to claim 1 wherein the second guide surface is secured to one of the first and second modules.

23. A torsional vibration damper according to claim 1 wherein the baffle is soldered to the first module.

24. A torsional vibration damper, comprising two modules (1, 2) that rotate in relation to each other, and a spring chamber (7), said first module (1) having a first guide surface (30) and sealing the spring chamber (7) radially outward, said first guide surface being a baffle soldered to the first module (1).

25. A torsional vibration damper, comprising two modules (1, 2) that rotate in relation to each other, and a spring chamber (7), said first module (1) having a first guide surface (30) and sealing the spring chamber (7) radially outward, whereby the first guide surface is at a distance from the second module (2) across a gap (31) and is essentially radial, wherein between the first and second guide surfaces (30, 50) there is provided a sealing ring (4) that covers the gap between the first guide surface (30) and the second module (2) at least when the torsional vibration damper is at rest, and further comprising an essentially radial second guide surface (50) which covers the gap (31) on the spring chamber side, and a guide disk for holding the sealing ring (4) under radial, inward pretension, said guide disk forming one of the two guide surfaces and so designed that the pretension is reduced when the torsional vibration damper rotates.

26. A torsional vibration damper according to claim 25 wherein the first guide surface (30) is a baffle (3) that is fixed to the first module (1), said baffle (3) being in the shape of a washer.

27. A torsional vibration damper according to claim 26 wherein the second guide surface (50) is designed as a guide disk (5).

28. A torsional vibration damper according to claim 27 wherein the guide disk (5) is in the shape of a washer.

29. A torsional vibration damper according to claim 27 wherein the guide disk (5) is fixed to the first guide surface (50).

30. A torsional vibration damper according to claim 27 wherein between the first guide surface (30) and the second guide surface (50) there is provided at least one opening (6) that faces the spring chamber (7).

31. A torsional vibration damper according to claim 30 wherein the opening (5) is situated so that a particle moving radially can pass through.

32. A torsional vibration damper according to claim 26 wherein the baffle is soldered to the first module.

33. A torsional vibration damper according to claim 25 wherein there is provided a calm area (40) between the first and second guide surfaces (30, 50) close to the gap (31) situated between the first guide surface (30) and the second module (29).

34. A torsional vibration damper according to claim 33 wherein the calm area (40) has an opening extending radially outward that leads to the spring chamber.

35. A torsional vibration damper according to claim 25 wherein the second module (2) has a third, essentially radial guide surface (20) that covers an axial gap (51) between the second guide surface (50) and the second module (2) on the side facing away from the spring chamber (7).

36. A torsional vibration damper according to claim 35 wherein the gap (31) between the first guide surface (30) and second module (2) is further removed in an axial direction from the spring chamber than the third guide surface (20).

37. A torsional vibration damper according to claim 25, and further comprising sealing means (3, 32, 42) for sealing a gap between the modules (1, 2) depending on an angle of rotation between the first module (1) and the second module (2).

38. A torsional vibration damper according to claim 37 wherein the sealing means (3, 32, 42) comprise at least one projection (32) that is moved axially upon a certain angle of rotation.

39. A torsional vibration damper according to claim 25, and further comprising a grease transporting system activated by centrifugal force.

40. A torsional vibration damper according to claim 39 wherein the grease transporting system has a grease collector arranged radially inwardly, a grease dispenser that is radially further out, and means provided between the grease dispenser and grease collector for moving the grease along its path from the grease dispenser to the grease collector in a peripheral direction.

41. A torsional vibration damper according to claim 40 wherein the grease collector is formed by a gap (51) directed behind a guide surface (5).

42. A torsional vibration damper according to claim 40 wherein the grease dispenser is formed by at least one opening (6) or a hole (60).

43. A torsional vibration damper according to claim 25 wherein the guide disk is so designed that the pretension is reduced to zero when the torsional vibration damper rotates.

44. A torsional vibration damper according to claim 25 wherein the gap is disposed at a level of the spring chamber.

45. A torsional vibration damper according to claim 25 wherein the second guide surface is secured to one of the first and second modules.

46. A torsional vibration damper, comprising two modules (1, 2) that rotate in relation to each other, and a spring chamber (7), said first module (1) having a first guide surface (30) and sealing the spring chamber (7) radially outward, whereby the first guide surface is at a distance from the second module (2) across a gap (31) and is essentially radial, and further comprising an essentially radial second guide surface (50) which covers the gap (31) on the spring chamber side, wherein the second module (2) has a third, essentially radial guide surface (20) that covers an axial gap (51) between the second guide surface (50) and the second module (2) on the side facing away from the spring chamber (7).

47. A torsional vibration damper according to claim 46 wherein the first guide surface (30) is a baffle (3) that is fixed to the first module (1), said baffle (3) being in the shape of a washer.

48. A torsional vibration damper according to claim 46 wherein the second guide surface (50) is designed as a guide disk (5).

49. A torsional vibration damper according to claim 48 wherein the guide disk (5) is in the shape of a washer.

50. A torsional vibration damper according to claim 48 wherein the guide disk (5) is fixed to the first guide surface (50).

51. A torsional vibration damper according to claim 48 wherein between the first guide surface (30) and the second guide surface (50) there is provided at least one opening (6) that faces the spring chamber (7).

52. A torsional vibration damper according to claim 51 wherein the opening (5) is situated so that a particle moving radially can pass through.

53. A torsional vibration damper according to claim 46 wherein there is provided a calm area (40) between the first and second guide surfaces (30, 50) close to the gap (31) situated between the first guide surface (30) and the second module (29).

54. A torsional vibration damper according to claim 53 wherein the calm area (40) has an opening extending radially outward that leads to the spring chamber.

55. A torsional vibration damper according to claim 46 wherein between the first and second guide surfaces (30, 50) there is provided a sealing ring (4) that covers the gap between the first guide surface (30) and the second module (2) at least when the torsional vibration damper is at rest.

56. A torsional vibration damper according to claim 55, and further comprising a guide disk for holding the sealing ring (4) under radial, inward pretension, said guide disk being so designed that the pretension is reduced to zero when the torsional vibration damper rotates.

57. A torsional vibration damper according to claim 46 wherein the gap (31) between the first guide surface (30) and second module (2) is further removed in an axial direction from the spring chamber than the third guide surface (20).

58. A torsional vibration damper according to claim 46, and further comprising sealing means (3, 32, 42) for sealing a gap between the modules (1, 2) depending on an angle of rotation between the first module (1) and the second module (2).

59. A torsional vibration damper according to claim 58 wherein the sealing means (3, 32, 42) comprise at least one projection (32) that is moved axially upon a certain angle of rotation.

60. A torsional vibration damper according to claim 46, and further comprising a grease transporting system activated by centrifugal force.

61. A torsional vibration damper according to claim 60 wherein the grease transporting system has a grease collector arranged radially inwardly, a grease dispenser that is radially further out, and means provided between the grease dispenser and grease collector for moving the grease along its path from the grease dispenser to the grease collector in a peripheral direction.

62. A torsional vibration damper according to claim 61 wherein the grease collector is formed by a gap (51) directed behind a guide surface (5).

63. A torsional vibration damper according to claim 61 wherein the grease dispenser is formed by at least one opening (6) or a hole (60).

64. A torsional vibration damper according to claim 46 wherein the gap is disposed at a level of the spring chamber.

65. A torsional vibration damper according to claim 46 wherein the second guide surface is secured to one of the first and second modules.

66. A torsional vibration damper according to claim 47 wherein the baffle is soldered to the first module.

67. A torsional vibration damper, comprising two modules (1, 2) that rotate in relation to each other, and a spring chamber (7), said first module (1) having a first guide surface (30) and sealing the spring chamber (7) radially outward, whereby the first guide surface is at a distance from the second module (2) across a gap (31) and is essentially radial, and further comprising an essentially radial second guide surface (50) which covers the gap (31) on the spring chamber side, and sealing means (3, 32, 42) for sealing a gap between the modules (1, 2) depending on an angle of rotation between the first module (1) and the second module (2).

68. A torsional vibration damper according to claim 67 wherein the first guide surface (30) is a baffle (3) that is fixed to the first module (1), said baffle (3) being in the shape of a washer.

69. A torsional vibration damper according to claim 68 wherein the baffle is soldered to the first module.

70. A torsional vibration damper according to claim 67 wherein the second guide surface (50) is designed as a guide disk (5).

71. A torsional vibration damper according to claim 70 wherein the guide disk (5) is in the shape of a washer.

72. A torsional vibration damper according to claim 70 wherein the guide disk (5) is fixed to the first guide surface (50).

73. A torsional vibration damper according to claim 70 wherein between the first guide surface (30) and the second guide surface (50) there is provided at least one opening (6) that faces the spring chamber (7).

74. A torsional vibration damper according to claim 73 wherein the opening (5) is situated so that a particle moving radially can pass through.

75. A torsional vibration damper according to claim 67 wherein there is provided a calm area (40) between the first and second guide surfaces (30, 50) close to the gap (31) situated between the first guide surface (30) and the second module (29).

76. A torsional vibration damper according to claim 75 wherein the calm area (40) has an opening extending radially outward that leads to the spring chamber.

77. A torsional vibration damper according to claim 67 wherein between the first and second guide surfaces (30, 50) there is provided a sealing ring (4) that covers the gap between the first guide surface (30) and the second module (2) at least when the torsional vibration damper is at rest.

78. A torsional vibration damper according to claim 77, and further comprising a guide disk for holding the sealing ring (4) under radial, inward pretension, said guide disk being so designed that the pretension is reduced to zero when the torsional vibration damper rotates.

79. A torsional vibration damper according to claim 67 wherein the second module (2) has a third, essentially radial guide surface (20) that covers an axial gap (51) between the second guide surface (50) and the second module (2) on the side facing away from the spring chamber (7), wherein the gap (31) between the first guide surface (30) and second module (2) is further removed in an axial direction from the spring chamber than the third guide surface (20).

80. A torsional vibration damper according to claim 67 wherein the sealing means (3, 32, 42) comprise at least one projection (32) that is moved axially upon a certain angle of rotation.

81. A torsional vibration damper according to claim 67, and further comprising a grease transporting system activated by centrifugal force.

82. A torsional vibration damper according to claim 81 wherein the grease transporting system has a grease collector arranged radially inwardly, a grease dispenser that is radially further out, and means provided between the grease dispenser and grease collector for moving the grease along its path from the grease dispenser to the grease collector in a peripheral direction.

83. A torsional vibration damper according to claim 82 wherein the grease collector is formed by a gap (51) directed behind a guide surface (5).

84. A torsional vibration damper according to claim 82 wherein the grease dispenser is formed by at least one opening (6) or a hole (60).

85. A torsional vibration damper according to claim 67 wherein the gap is disposed at a level of the spring chamber.

86. A torsional vibration damper according to claim 67 wherein the second guide surface is secured to one of the first and second modules.

87. A torsional vibration damper, comprising two modules (1, 2) that rotate in relation to each other, and a spring chamber (7), said first module (1) having a first guide surface (30) and sealing the spring chamber (7) radially outward, whereby the first guide surface is at a distance from the second module (2) across a gap (31) and is essentially radial, and further comprising an essentially radial second guide surface (50) which covers the gap (31) on the spring chamber side, and a grease transporting system activated by centrifugal force, said grease transporting system having a grease collector arranged radially inwardly, a grease dispenser that is radially further out, and means provided between the grease dispenser and grease collector for moving the grease along its path from the grease dispenser to the grease collector in a peripheral direction.

88. A torsional vibration damper according to claim 87 wherein the first guide surface (30) is a baffle (3) that is fixed to the first module (1), said baffle (3) being in the shape of a washer.

89. A torsional vibration damper according to claim 88 wherein the baffle is soldered the first module.

90. A torsional vibration damper according to claim 87 wherein the second guide surface (50) is designed as a guide disk (5).

91. A torsional vibration damper according to claim 90 wherein the guide disk (5) is in the shape of a washer.

92. A torsional vibration damper according to claim 90 wherein the guide disk (5) is fixed to the first guide surface (50).

93. A torsional vibration damper according to claim 90 wherein between the first guide surface (30) and the second guide surface (50) there is provided at least one opening (6) that faces the spring chamber (7).

94. A torsional vibration damper according to claim 93 wherein the opening (5) is situated so that a particle moving radially can pass through.

95. A torsional vibration damper according to claim 88 wherein there is provided a calm area (40) between the first and second guide surfaces (30, 50) close to the gap (31) situated between the first guide surface (30) and the second module (29).

96. A torsional vibration damper according to claim 95 wherein the calm area (40) has an opening extending radially outward that leads to the spring chamber.

97. A torsional vibration damper according to claim 87 wherein between the first and second guide surfaces (30, 50) there is provided a sealing ring (4) that covers the gap between the first guide surface (30) and the second module (2) at least when the torsional vibration damper is at rest.

98. A torsional vibration damper according to claim 97 and further comprising a guide disk for holding the sealing ring (4) under radial, inward pretension, said guide disk being so designed that the pretension is reduced to zero when the torsional vibration damper rotates.

99. A torsional vibration damper according to claim 87 wherein the second module (2) has a third, essentially radial guide surface (20) that covers an axial gap (51) between the second guide surface (50) and the second module (2) on the side facing away from the spring chamber (7), wherein the gap (31) between the first guide surface (30) and second module (2) is further removed in an axial direction from the spring chamber than the third guide surface (20).

100. A torsional vibration damper according to claim 87 and further comprising sealing means (3, 32, 42) for sealing a gap between the modules (1, 2) depending on an angle of rotation between the first module (1) and the second module (2), wherein the sealing means (3, 32, 42) comprise at least one projection (32) that is moved axially upon a certain angle of rotation.

101. A torsional vibration damper according to claim 87 wherein the grease collector is formed by a gap (51) directed behind a guide surface (5).

102. A torsional vibration damper according to claim 87 wherein the grease dispenser is formed by at least one opening (6) or a hole (60).

103. A torsional vibration damper according to claim 87 wherein the gap is disposed at a level of the spring chamber.

104. A torsional vibration damper according to claim 87 wherein the second guide surface is secured to one of the first and second modules.

105. A torsional vibration damper, comprising two modules (1, 2) that rotate in relation to each other, and a spring chamber (7), said first module (1) having a first guide surface (30) and sealing the spring chamber (7) radially outward, whereby the first guide surface is at a distance from the second module (2) across a gap (31) and is essentially radial, and further comprising an essentially radial second guide surface (50) which covers the gap (31) on the spring chamber side, wherein the gap is disposed at a level of the spring chamber.

106. A torsional vibration damper according to claim 105 wherein the first guide surface (30) is a baffle (3) that is fixed to the first module (1), said baffle (3) being in the shape of a washer.

107. A torsional vibration damper according to claim 106, and further comprising a grease transporting system activated by centrifugal force, wherein the grease transporting system has a grease collector arranged radially inwardly, a grease dispenser that is radially further out, and means provided between the grease dispenser and grease collector for moving the grease along its path from the grease dispenser to the grease collector in a peripheral direction, wherein the grease collector is formed by a gap (51) directed behind a guide surface (5).

108. A torsional vibration damper according to claim 106, and further comprising a grease transporting system activated by centrifugal force, wherein the grease transporting system has a grease collector arranged radially inwardly, a grease dispenser that is radially further out, and means provided between the grease dispenser and grease collector for moving the grease along its path from the grease dispenser to the grease collector in a peripheral direction, wherein the grease dispenser is formed by at least one opening (6) or a hole (60).

109. A torsional vibration damper according to claim 105 wherein the second guide surface (50) is designed as a guide disk (5).

110. A torsional vibration damper according to claim 109 wherein the guide disk (5) is in the shape of a washer.

111. A torsional vibration damper according to claim 109 wherein between the first guide surface (30) and the second guide surface (50) there is provided at least one opening (6) that faces the spring chamber (7).

112. A torsional vibration damper according to claim 111 wherein the opening (5) is situated so that a particle moving radially can pass through.

113. A torsional vibration damper according to claim 109 wherein the baffle is soldered to the first module.

114. A torsional vibration damper according to claim 109 wherein the guide disk (5) is fixed to the first guide surface (50).

115. A torsional vibration damper according to claim 105 wherein there is provided a calm area (40) between the first and second guide surfaces (30, 50) close to the gap (31) situated between the first guide surface (30) and the second module (29).

116. A torsional vibration damper according to claim 115 wherein the calm area (40) has an opening extending radially outward that leads to the spring chamber.

117. A torsional vibration damper according to claim 105 wherein between the first and second guide surfaces (30, 50) there is provided a sealing ring (4) that covers the gap between the first guide surface (30) and the second module (2) at least when the torsional vibration damper is at rest.

118. A torsional vibration damper according to claim 117, and further comprising a guide disk for holding the sealing ring (4) under radial, inward pretension, said guide disk being so designed that the pretension is reduced to zero when the torsional vibration damper rotates.

119. A torsional vibration damper according to claim 105 wherein the second module (2) has a third, essentially radial guide surface (20) that covers an axial gap (51) between the second guide surface (50) and the second module (2) on the side facing away from the spring chamber (7), wherein the gap (31) between the first guide surface (30) and second module (2) is further removed in an axial direction from the spring chamber than the third guide surface (20).

120. A torsional vibration damper according to claim 105, and further comprising sealing means (3, 32, 42) for sealing a gap between the modules (1, 2) depending on an angle of rotation between the first module (1) and the second module (2), wherein the sealing means (3, 32, 42) comprise at least one projection (32) that is moved axially upon a certain angle of rotation.

121. A torsional vibration damper according to claim 105, and further comprising a grease transporting system activated by centrifugal force.

122. A torsional vibration damper, comprising two modules (1, 2) that rotate in relation to each other, and a spring chamber (7), said first module (1) having a first guide surface (30) and sealing the spring chamber (7) radially outward, whereby the first guide surface is at a distance from the second module (2) across a gap (31) and is essentially radial, and further comprising an essentially radial second guide surface (50) which covers the gap (31) on the spring chamber side, wherein the second guide surface is secured to one of the first and second modules.

123. A torsional vibration damper according to claim 122 wherein the first guide surface (30) is a baffle (3) that is fixed to the first module (1), said baffle (3) being in the shape of a washer.

124. A torsional vibration damper according to claim 123 wherein the baffle is soldered to the first module.

125. A torsional vibration damper according to claim 122 wherein the second guide surface (50) is designed as a guide disk (5).

126. A torsional vibration damper according to claim 122 wherein the guide disk (5) is in the shape of a washer.

127. A torsional vibration damper according to claim 122 wherein the guide disk (5) is fixed to the first guide surface (50).

128. A torsional vibration damper according to claim 122 wherein between the first guide surface (30) and the second guide surface (50) there is provided at least one opening (6) that faces the spring chamber (7).

129. A torsional vibration damper according to claim 128 wherein the opening (5) is situated so that a particle moving radially can pass through.

130. A torsional vibration damper according to claim 122 wherein there is provided a calm area (40) between the first and second guide surfaces (30, 50) close to the gap (31) situated between the first guide surface (30) and the second module (29).

131. A torsional vibration damper according to claim 130 wherein the calm area (40) has an opening extending radially outward that leads to the spring chamber.

132. A torsional vibration damper according to claim 130 wherein between the first and second guide surfaces (30, 50) there is provided a sealing ring (4) that covers the gap between the first guide surface (30) and the second module (2) at least when the torsional vibration damper is at rest.

133. A torsional vibration damper according to claim 132 and further comprising a guide disk for holding the sealing ring (4) under radial, inward pretension, said guide disk being so designed that the pretension is reduced to zero when the torsional vibration damper rotates.

134. A torsional vibration damper according to claim 122 wherein the second module (2) has a third, essentially radial guide surface (20) that covers an axial gap (51) between the second guide surface (50) and the second module (2) on the side facing away from the spring chamber (7), wherein the gap (31) between the first guide surface (30) and second module (2) is further removed in an axial direction from the spring chamber than the third guide surface (20).

135. A torsional vibration damper according to claim 122, and further comprising sealing means (3, 32, 42) for sealing a gap between the modules (1, 2) depending on an angle of rotation between the first module (1) and the second module (2), wherein the sealing means (3, 32, 42) comprise at least one projection (32) that is moved axially upon a certain angle of rotation.

136. A torsional vibration damper according to claim 122, and further comprising a grease transporting system activated by centrifugal force.

137. A torsional vibration damper according to claim 122, and further comprising a grease transporting system activated by centrifugal force, wherein the grease transporting system has a grease collector arranged radially inwardly, a grease dispenser that is radially further out, and means provided between the grease dispenser and grease collector for moving the grease along its path from the grease dispenser to the grease collector in a peripheral direction, wherein the grease collector is formed by a gap (51) directed behind a guide surface (5).

138. A torsional vibration damper according to claim 122, and further comprising a grease transporting system activated by centrifugal force, wherein the grease transporting system has a grease collector arranged radially inwardly, a grease dispenser that is radially further out, and means provided between the grease dispenser and grease collector for moving the grease along its path from the grease dispenser to the grease collector in a peripheral direction, wherein the grease dispenser is formed by at least one opening (6) or a hole (60).

139. A torsional vibration damper according to claim 122 wherein the gap is disposed at a level of the spring chamber.

140. A torsional vibration damper, comprising two modules (1, 2) that rotate in relation to each other, and a spring chamber (7), said first module (1) having a first guide surface (30) and sealing the spring chamber (7) radially outward, whereby the first guide surface is at a distance from the second module (2) across a gap (31) and is essentially radial, and further comprising an essentially radial second guide surface (50) which covers the gap (31) on the spring chamber side, wherein there is provided a calm area (40) between the first and second guide surfaces (30, 50) close to the gap (31) situated between the first guide surface (30) and the second module (29), wherein the calm area (40) has an opening extending radially outward that leads to the spring chamber.

141. A torsional vibration damper according to claim 140 wherein the first guide surface (30) is a baffle (3) that is fixed to the first module (1), said baffle (3) being in the shape of a washer.

142. A torsional vibration damper according to claim 141 wherein the baffle is soldered to the first module.

143. A torsional vibration damper according to claim 140 wherein the second guide surface (50) is designed as a guide disk (5).

144. A torsional vibration damper according to claim 143 wherein the guide disk (5) is in the shape of a washer.

145. A torsional vibration damper according to claim 143 wherein the guide disk (5) is fixed to the first guide surface (50).

146. A torsional vibration damper according to claim 143 wherein between the first guide surface (30) and the second guide surface (50) there is provided at least one opening (6) that faces the spring chamber (7).

147. A torsional vibration damper according to claim 146 wherein the opening (5) is situated so that a particle moving radially can pass through.

148. A torsional vibration damper according to claim 140 wherein between the first and second guide surfaces (30, 50) there is provided a sealing ring (4) that covers the gap between the first guide surface (30) and the second module (2) at least when the torsional vibration damper is at rest.

149. A torsional vibration damper according to claim 148 and further comprising a guide disk for holding the sealing ring (4) under radial, inward pretension, said guide disk being so designed that the pretension is reduced to zero when the torsional vibration damper rotates.

150. A torsional vibration damper according to claim 140 wherein the second module (2) has a third, essentially radial guide surface (20) that covers an axial gap (51) between the second guide surface (50) and the second module (2) on the side facing away from the spring chamber (7), wherein the gap (31) between the first guide surface (30) and second module (2) is further removed in an axial direction from the spring chamber than the third guide surface (20).

151. A torsional vibration damper according to claim 140, and further comprising sealing means (3, 32, 42) for sealing a gap between the modules (1, 2) depending on an angle of rotation between the first module (1) and the second module (2), wherein the sealing means (3, 32, 42) comprise at least one projection (32) that is moved axially upon a certain angle of rotation.

152. A torsional vibration damper according to claim 140, and further comprising a grease transporting system activated by centrifugal force.

153. A torsional vibration damper according to claim 140, and further comprising a grease transporting system activated by centrifugal force, wherein the grease transporting system has a grease collector arranged radially inwardly, a grease dispenser that is radially further out, and means provided between the grease dispenser and grease collector for moving the grease along its path from the grease dispenser to the grease collector in a peripheral direction, wherein the grease collector is formed by a gap (51) directed behind a guide surface (5).

154. A torsional vibration damper according to claim 140, and further comprising a grease transporting system activated by centrifugal force, wherein the grease transporting system has a grease collector arranged radially inwardly, a grease dispenser that is radially further out, and means provided between the grease dispenser and grease collector for moving the grease along its path from the grease dispenser to the grease collector in a peripheral direction, wherein the grease dispenser is formed by at least one opening (6) or a hole (60).

* * * * *